W. H. BURRITT.
VEHICLE WHEEL.
APPLICATION FILED MAR. 29, 1915.

1,211,076.

Patented Jan. 2, 1917.
2 SHEETS—SHEET 1.

WITNESSES:
Harry A. Beirne
Else M. Siegel

INVENTOR.
William H. Burritt
BY
ATTORNEY.

W. H. BURRITT.
VEHICLE WHEEL.
APPLICATION FILED MAR. 29, 1915.
1,211,076.
Patented Jan. 2, 1917.
2 SHEETS—SHEET 2.
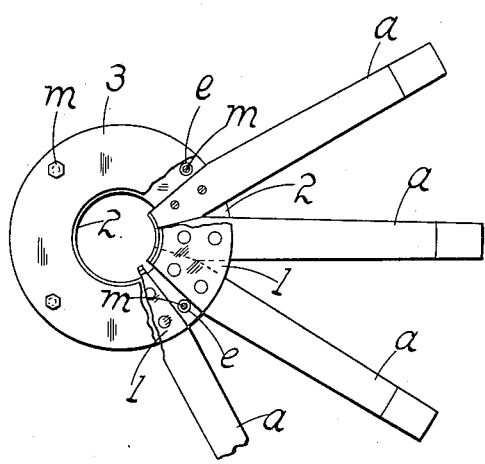
Fig. 5.
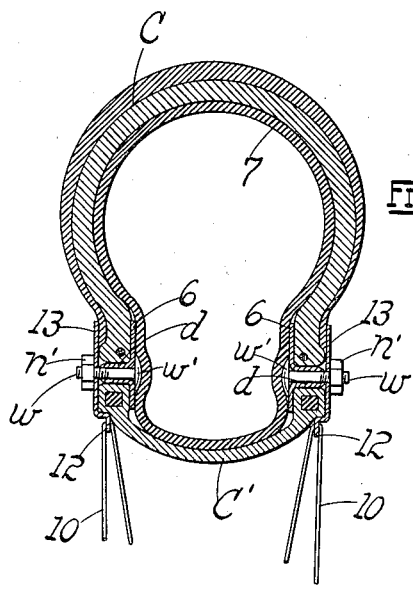
Fig. 6.
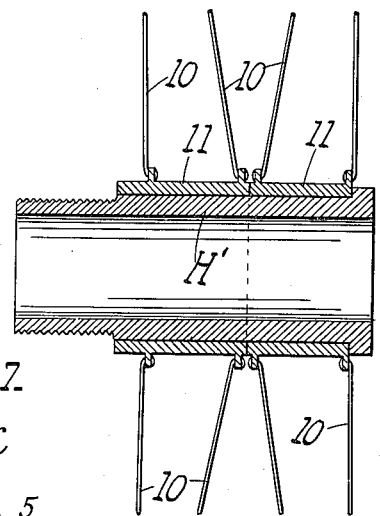
Fig. 7.
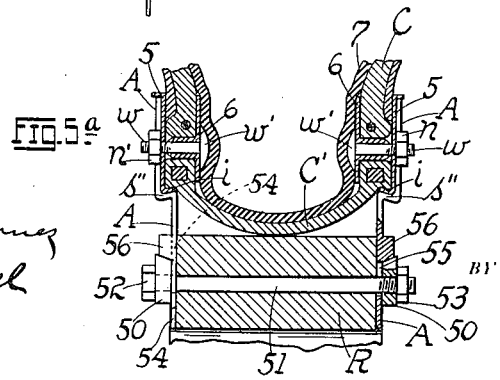
Fig. 5ª.
WITNESSES:
Harry A. Benner
Else M. Siegel
INVENTOR.
William H. Burritt.
BY
Emil Starra
ATTORNEY.

UNITED STATES PATENT OFFICE.

WILLIAM H. BURRITT, OF ST. LOUIS, MISSOURI.

VEHICLE-WHEEL.

1,211,076. Specification of Letters Patent. Patented Jan. 2, 1917.

Application filed March 29, 1915. Serial No. 17,781.

*To all whom it may concern:*

Be it known that I, WILLIAM H. BURRITT, a citizen of the United States, residing at St. Louis, State of Missouri, have invented certain new and useful Improvements in Vehicle-Wheels, of which the following is a full, clear, and exact description, reference being had to the accompanying drawings, forming a part hereof.

My invention has relation to improvements in vehicle wheels and tires therefor; and it consists in the novel features of construction more fully set forth in the specification and pointed out in the claims.

The present improvement is directed to the construction of a vehicle wheel provided with a pneumatic tire, the object in view being to effect the release or demounting of the rim into which the tire enters as an element, by a radial adjustment of the spokes or body of the wheel, that is to say, an adjustment in the general plane of rotation of the wheel. The tire is on the order of that forming the subject-matter of my pending application 711,998, filed July 29, 1912, the invention herein being more particularly directed to the securing means for the tire, such means entering more or less into the construction of the wheel proper.

A further object is to provide means which will permit a ready and quick adjustment of the rim of the wheel; one which will securely lock the rim in place when once adjusted; one which will permit quick demounting of the rim; and one possessing other advantages to be more particularly pointed out in a detailed description of the invention in connection with the accompanying drawings in which—

Figure 1:
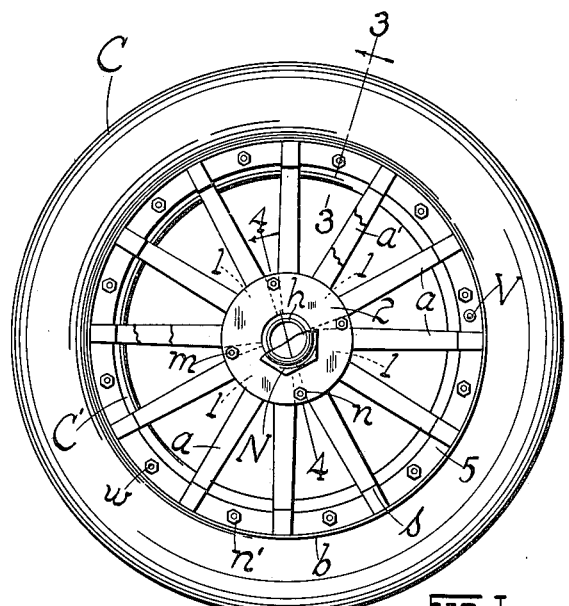
Figure 2:
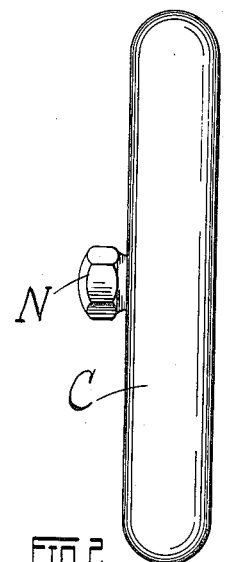
Figure 3:
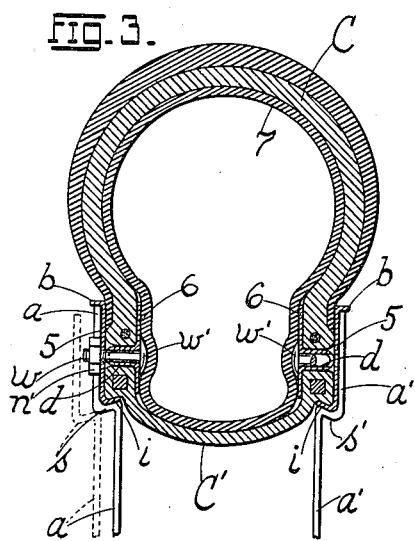
Figure 4:
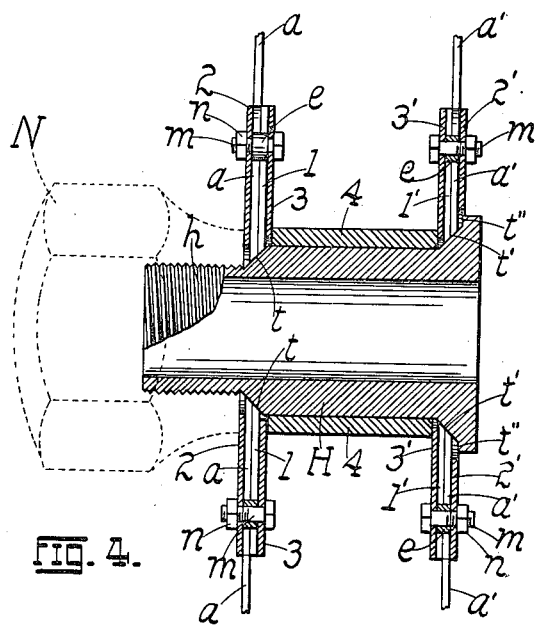

Figure 1 is a side elevation of a vehicle wheel showing one form of my invention; Fig. 2 is an edge view thereof; Fig. 3 is an enlarged cross-section through the rim on the line 3—3 of Fig. 1; Fig. 4 is an enlarged cross-section through the hub of the wheel on the line 4—4 of Fig. 1; Fig. 5 is an enlarged side elevational detail of one of the spoke sections or clusters showing the manner of attaching the inner ends thereof: Fig. 5ª is a sectional view on the order of Fig. 3, showing a modified application of my invention; and Figs. 6 and 7 are sectional views corresponding respectively to the sections shown in Figs. 3 and 4, showing another modified application of my invention.

Referring to the drawings, and for the present to Figs. 1 to 5 inclusive, H represents the hub of a vehicle wheel from which radiate two sets or series of spokes $a$, $a'$, respectively, the spokes $a$ being for convenience termed as the outer set or that on the outer face of the wheel, and the spokes $a'$ as the inner set or that facing the body of the vehicle to which the wheel is applied. The series of spokes are disposed in distinct planes substantially parallel to the plane of rotation of the wheel, the spokes of one set or series being opposite to those of the adjacent set, as fully shown in the drawings. In the present embodiment of my invention I show twelve spokes for each set or series, each set being in turn composed of four sections, each section comprising a cluster of three spokes. The inner or converging ends of the members $a$ composing a cluster or section are riveted or otherwise secured to a sector plate 1, the cluster members $a'$ being secured to a similar sector plate $1'$, the sectors being on the inside of the wheel, that is to say they face inwardly, the spokes being on the outside. The sectors 1 ($1'$) are virtually radial segments of an annular plate or ring divided into four parts, each part having a cluster of three spokes secured thereto. The inner terminals of any cluster of spokes $a$ and the corresponding inner edge of their sector plate are beveled, being disposed along a common conical surface as shown (Fig. 4), the beveled surfaces engaging a corresponding beveled or conical shoulder $t$ formed on the hub H at the base of the outer screw-threaded nipple or extension $h$ thereof. For convenience, and unless otherwise specified, the cluster of spokes ($a$, $a'$,) with their sector plate (1, $1'$) will be hereinafter referred to as a "spoke section" there being four such sections in the present example for each set of spokes. It is of course obvious that the sector 1 could be formed integrally with its spokes in lieu of the riveting together of the parts as described. The inner portion of each spoke section comprising three spokes $a$ (as just designated) is movably confined and guided between outer and inner bounding rings 2, 3, respectively, said guiding rings or annular plates freely encompassing the hub and clearing the shoulder $t$. The rings are bound together at points between consecutive spoke sections by bolts $m$, provided with the usual clamping nuts $n$, the spacing between the rings being maintained uniform by suitable spacing thimbles $e$ as shown. In like manner each spoke section comprising three spokes $a'$ is movably confined and guided between corresponding outer and inner rings or annular plates $2'$, $3'$, the inner beveled terminal of the spoke section engaging the surface of an inclined or conical shoulder $t'$ formed adjacent the inner terminal of the hub H, the base of the incline $t'$ being bounded by an annular ledge or extension $t''$ disposed in a plane at right angles to the axis of the hub, the conical surfaces $t$, $t'$, being parallel and both concentric with the hub axis, the shoulder $t'$ being exterior, and the shoulder $t$ interior to, the cylindrical periphery of the hub as shown. Between the opposing rings 3, $3'$, and embracing the periphery of the hub, is interposed a sleeve 4 movable longitudinally along the hub, the ends of the sleeve bearing against the adjacent faces of the said rings (3, $3'$,).

N represents the nut or rotatable head by which the spokes are maintained in proper position on the hub, and by which they are forced into engagement with, or disengaged from, the rim of the wheel, a feature now to be described. Formed in the spokes $a$, a suitable distance from the free outer terminals thereof are inclined shoulders $s$, corresponding shoulders $s'$ being formed in the spokes $a'$. Any equivalent offsets or formations are however contemplated by my invention and I do not wish to confine myself to the specific shoulders $s$, $s'$, as shown. The offsets might be formed of separate pieces of metal and not necessarily formed integrally with the spokes as shown. Disposed exteriorly to the shoulders or offsets $s$, $s'$, and adapted to be engaged by the inner faces of the portions of the spokes lying between the shoulders and the free outer ends of the spokes are the outer felly rings 5, 5, corresponding inner felly rings 6, 6, being disposed opposite to, and spaced from the outer rings as shown. The inner felly ring is formed with an outer annular hollow rib $d$ formed by folding of the metal of which the ring 6 is composed, the metal not being doubled on itself however, the folded portions or walls being left spaced apart so as to impart a U-shaped cross-section to the rib (Fig. 3). Through the hollow rib thus formed, the stems of the bolts $w$ by which the rings 5, 6, are secured together, are passed, the rounded heads $w'$ of the bolts bearing against the ring 6, and the clamping nuts $n'$ bearing against the outer felly ring 5. The rib $d$ thus serves not only to house the bolts $w$, but to space the felly rings apart. Between the felly rings, exteriorly to the rib $d$, are inserted the beaded edges of the outer pneumatic tire casing C, the same corresponding in all essential particulars to the ordinary pneumatic tire casing; and between the felly rings but interiorly to the rib $d$ are inserted the beaded edges of the inner tire casing $C'$, the contiguous beaded portions of the respective tire casings bearing against the adjacent walls or folds of the spacing and stiffening rib $d$ (Fig. 3). The outer edge of the outer felly ring is provided with an outwardly projecting flange $b$ which is engaged by the abutting ends of the spokes when the parts of the wheel are properly assembled. The inner edge of each felly ring 5 on the other hand is provided with an inwardly projecting inclined flange $i$ which serves not only to engage the beaded edge of the inner casing $C'$, but as a support for the shoulder or offset $s$ ($s'$) of the spokes, thus protecting the beads of the casing against direct contact with the shoulders of the spokes. The assembled casings C, $C'$, are provided with an inner inflatable sack or tube 7 which may be inflated through the check-valve V as well understood in the art. The member 7 covers the inner felly rings 6, 6, the latter being confined between said tube 7 and the casings C, $C'$. The spokes $a$, $a'$, while rigid, may have more or less spring, so long as they serve to perform their proper function in the wheel.

The operation may be readily understood from the foregoing description, and in brief may be described as follows: To assemble the wheel the inner spoke sections (or those comprising the spokes $a'$) with their rings $2'$, $3'$, are passed over the peripheral cylindrical surface of the hub H and against the inclined shoulder $t'$. Then the sleeve 4 is passed over the hub, and finally the outer spoke sections (composed of the spokes $a$) with their rings 2, 3, are passed over the nipple $h$ and against the shoulder $t$. The casings C, $C'$, with their felly rings 5, 6, are then deposited between the outer ends of the opposing spoke sections, the flanges $i$ of the outer felly rings 5 which support the beaded edges of the inner casing $C'$, being deposited on the shoulders or offsets $s$, $s'$, of the more or less rigid spokes, said shoulders by the way, inclining outwardly toward the rotation axis of the wheel. By now passing the nut N over the nipple $h$ and driving the same firmly against the outer ring 2, the rings 2, 3, and at the same time the rings $2'$, $3'$, through the sleeve 4, will be forced longitudinally along the hub, carrying the spoke sections with them. The spoke sections however thus longitudinally advanced, will be caused to ride "up" the parallel inclines $t$, $t'$, (each spoke section being free to move radially between its guide rings 2, 3, $2'$, $3'$,) or in other words the spoke sections will be forced or distended or expanded radially outward, thereby forcing the shoulders $s$, $s'$, firmly against the flanges $i$ of the felly rings 5, 5, locking the same thereto, and securely clamping the beaded edges of the inner casing $C'$ between the shoulders $s$, $s'$, (engaging the flanges $i$) and the ribs $d$ of the inner felly rings 6, the outer casing $C$ being of course maintained in position between the felly rings by the fastening bolts $w$, the width of the rib $d$ being insufficient to prevent the necessary drawing together of the inner and outer felly rings by the nuts $n'$, and the consequent compression of the beads of the casings to secure a good grip on the casings. Thus the spoke sections become locked to the casings $C$, $C'$, and the felly rings carrying the same with a minimum expenditure of time. On the other hand, by merely unscrewing the nut $N$, and relieving the pressure from the outer ring 2, the pressure is at once relieved from the ring $3'$, thereby allowing the spoke sections to slide "down" to the inclines $t$, $t'$. Thus the spoke sections are free to contract radially or draw away from the outer felly rings 5, 5, and when the contraction is sufficient to cause the shoulders $s$, $s'$, of the spokes to clear the flanges $i$, $i$, of said rings, the outer spoke sections (for example) may be slipped outwardly along the hub a sufficient distance to permit the ready removal of the casings $C$, $C'$, and their associated felly rings, which several members ($C$, $C'$, 5, 6,) may be said to jointly constitute the rim of the wheel. In other words we have what is usually designated as a demountable rim. The rings 2, 3, $2'$, $3'$, of course do not participate in the inclined movements of the spoke-sections, since the walls of the ring openings clear the inclined faces of the shoulders $t$, $t'$, the latter being engaged merely by the beveled ends of the spoke sections. The annular shoulder $t''$ of course serves to limit the outward movement of the spokes $a'$ and prevent the same from being forced off the hub. Should there be any tendency toward outward flexure on the part of the spokes, the inclined seats formed by the flanges $i$ for the inclined shoulders $s$, $s'$, will prevent such flexure, the spokes being effectively locked to the rim against outward movement once the shoulders $s$, $s'$, have secured a good purchase on the ledges formed by the flanges $i$ of the rings 5.

In the form described, the spokes $a$, $a'$, or their equivalents, lead from the hub H of the wheel; but I may lock the demountable rim to the felly of the conventional vehicle wheel as shown in the modification in Fig. 5ª. In that case I mount on opposite faces of the felly R, a wedge or block 50, said wedges being secured in place by a bolt 51, whose head 52 engages the outer face of one block, the nut 53 engaging the opposite block or wedge. In lieu of the conventional spokes (which usually radiate from the hub of the wheel) I provide the radially disposed members or arms, or felly extensions A, A, disposed in radial grooves or ways 54 on the opposite faces of the felly, each member being provided with an elongated slot 55 traversed by the bolt 51, the inner terminal of the arm or member terminating at the inner cylindrical face of the felly. Formed integrally with or secured to each arm A is a wedge 56 coöperating with the wedge 50 controlled by the bolt. Like the spokes $a$, $a'$, the arms A, A, are provided with shoulders or offsets $s''$ engaging the flanges $i$ of the outer felly rings 5, 5, the rim being identical with that already described in connection with Figs. 1 to 5 inclusive, and having its component parts identified with the same reference symbols. By driving home the nut 53 of any bolt identified with any pair of arms A, A, the wedges 50 and 56 will act to force the members A, A, radially outward, and lock the same to the rim, the operation being in all essential particulars the same as the action of the member N on the spokes $a$, $a'$. Like the spokes $a$, $a'$, the members A, A, may be said to constitute radially adjustable members interposed between the outer rim and axis of rotation of the wheel, although their control is accompanied by devices removed from the hub of the wheel, that is to say, by means of devices (50) mounted on the felly R, said devices actuating said members to and from the rim.

In lieu of the rigid or stiff spokes $a$, $a'$, or their equivalents A, A, I may substitute wire spokes 10 anchored to a sleeve 11 composed of two sections passed over the hub H, as shown in the modification in Figs. 6 and 7. In that event the ends of the wires are anchored to the hub in any suitable mechanical manner and the wires looped through the inner annular flange 12 (or its equivalent) of the outer felly ring 13, the inner felly ring 6, rib $d$, bolts $w$, and casings C and $C'$ and tube 7, being the same as the corresponding parts described in the first form, and consequently identified by the same reference symbols. Of course in the modification (Figs. 6, 7,) we do not have the advantage of demountability of the rim as in the first form described; at least the rim can not be removed or demounted in the same manner as pointed out in connection with the first form.

I may of course depart considerably from the details here shown and described without in any wise affecting the nature or spirit of the invention.

Having described my invention what I claim is:

1. In combination with a vehicle-wheel provided with a hub, series of spokes radiating from said hub in two distinct planes spaced apart, an outer felly ring at the free ends of each series of spokes, an inner felly ring opposite the outer ring, a tire secured to the rings and forming therewith the rim of the wheel, said rim being shouldered to and between the series of spokes disposed in the respective planes aforesaid, and a controllable member on the hub for forcing the shoulders of the respective spokes into locking engagement with the tire.

2. In combination with a vehicle-wheel provided with a hub, series of spokes radiating from said hub in two distinct planes spaced apart, an outer felly ring at the free ends of each series of spokes, an inner felly ring opposite to the outer ring, a spacing rib between the rings, a pneumatic tire comprising inner and outer casings having their edges confined between the respective rings and brought into contiguous relation opposite the spacing rib between the rings, means for clamping the casings to the rings, shoulders or offsets formed on the spokes at points to cause said offsets to engage the walls of the openings of the outer rings, and a controllable member on the hub for forcing the shoulders of the several spokes into locking engagement with said outer felly rings.

3. In combination with a vehicle-wheel provided with a hub, series of body sections radiating from the hub and having inner terminal beveled edges inclined to the axis of the hub, an outer rim, the hub having inclined peripheral formations disposed at different radial distances from the axis of the hub coöperating with the beveled edges of the body sections, and means on the hub for forcing the body sections along the inclined portions of the hub whereby the said sections are locked to the rim.

4. In combination with a vehicle-wheel provided with a hub, series of spokes radiating from said hub in two distinct planes spaced apart, outer and inner felly rings disposed in pairs at the free outer ends of each series of spokes, a channel rib on the inner felly ring maintaining a space between the rings, a tire comprising an outer casing disposed exteriorly to the felly rings, an inner casing disposed interiorly to the felly rings, the edges of the casings engaging the ribs from opposite sides and confined between the respective rings, the spokes being provided with offsets engaging the walls of the openings of the outer rings and having portions beyond the offsets engaging the outer faces of the outer rings, the spokes being adjustable radially, and means on the hub for forcing the offsets on the spokes against the walls of the openings of the outer felly rings and outer edges of the inner casing, whereby the spokes are locked to the tire.

5. In combination with a vehicle-wheel, a rim comprising inner and outer felly rings disposed in pairs spaced apart, a rib between the members of each pair for spacing said members apart, the walls of the openings of the outer rings being provided with flanges forming ledges inclining downward and outward toward the axis of rotation of the wheel, an inner casing having beaded edges confined between the rings and bearing against the ribs and ledges respectively, an outer casing having beaded edges confined between the rings and bearing against the outer walls of the ribs, a hub for the wheel, and means leading from the hub and engaging the ledges of the rim for locking the latter to the wheel.

6. In a vehicle-wheel of the character described, a hub having a peripheral cylindrical portion, conical shoulders formed at each end of the cylindrical portion, the one shoulder being interior and the other exterior to the periphery of said cylindrical portion, the surfaces of the respective shoulders being parallel, spoke sections terminating in inner beveled edges engaging the respective surfaces of the conical shoulders, a sleeve mounted slidably on the hub and connecting the two sets of spokes, a nut on the hub for driving the spokes up the inclined surfaces of the conical shoulders, and a rim for receiving the thrust of the spokes, whereby the rim becomes locked to the spokes.

7. In a vehicle-wheel, a rim comprising inner and outer felly rings disposed in pairs spaced apart, a channel rib formed on the inner ring and opening inwardly, said rib serving to space the inner and outer rings of each pair a fixed distance apart, an outer marginally beaded casing having its edges confined between the rings of the respective pairs and engaging the outer face of the rib, an inner marginally beaded casing having its edges confined between the rings of the respective pairs and engaging the inner face of the rib, clamping bolts traversing the channels of the ribs and coupling the rings of each pair together, the outer ring having an inner inclined flange forming a spoke-supporting ledge, and an inner inflatable tube for the casings.

8. In a vehicle wheel of the character described, a rim provided with outer marginal ledges facing the axis of rotation of the wheel, and inclined outwardly and downwardly toward said axis, and independent sets of spokes disposed in distinct planes spaced apart, engaging said ledges.

In testimony whereof I affix my signature, in presence of two witnesses.

WILLIAM H. BURRITT.

Witnesses:
EMIL STAREK,
ELSE M. SIEGEL.